US006327663B2

(12) United States Patent
Isaac et al.

(10) Patent No.: US 6,327,663 B2
(45) Date of Patent: *Dec. 4, 2001

(54) SYSTEM AND METHOD FOR PROCESSOR DUAL VOLTAGE DETECTION AND OVER STRESS PROTECTION

(75) Inventors: Gerald G. Isaac, Palo Alto; Dervinn D. Caldwell, Fremont; Lance L. Smith; Joseph A. Brcich, both of San Jose, all of CA (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/176,737

(22) Filed: Oct. 21, 1998

(51) Int. Cl.$^7$ ........................................................ G06F 13/10
(52) U.S. Cl. .................................................. 713/300; 713/1
(58) Field of Search .................................. 710/102, 103; 713/1, 100, 300–340; 770/104

(56) References Cited

U.S. PATENT DOCUMENTS

| | | |
|---|---|---|
| 5,546,563 | 8/1996 | Chuang . |
| 5,551,012 | 8/1996 | Chuang et al. . |
| 5,613,130 | 3/1997 | Teng et al. . |
| 5,757,171 * | 5/1998 | Babcock ............................. 323/271 |
| 5,862,351 * | 1/1999 | He ........................................ 713/1 |
| 5,864,225 * | 1/1999 | Bryson ............................... 323/268 |
| 5,939,868 * | 8/1999 | Hall et al. .......................... 323/281 |
| 5,943,227 * | 8/1999 | Bryson et al. ........................ 363/95 |
| 5,951,681 * | 9/1999 | Chang .................................. 713/1 |
| 6,035,407 * | 3/2000 | Gebara et al. ...................... 713/300 |
| 6,058,030 * | 5/2000 | Hawkes et al. ...................... 363/65 |

OTHER PUBLICATIONS

AMD–K6 Processor Data Sheet, Mr. 1998.*
Application Note: AMD–K5™: Support for the AMD–K5 Dual Voltage Processor, Publication #19766, Rev: C, Issue Date: Sep. 1996, pp. 1–18.

Application Note: intel® Pentium® Processor Flexible Motherboard Design Guidelines, AP–579, Order No: 243187–002, Jun. 1997, pp. 1–54.

Application Note: intel® Voltage Guidelines for Pentium® Processors with MMX™ Technology, AP–580, Order No.: 243186–003, Jun. 1997, 1–30.

intel® Pentium® Pro Processor at 150 MHz, 166 MHz, 180 MHz And 200 MHz, Order No.: 242769–003, Feb. 1996, 3 pages.

"AMD–K6, MMx Enhanced Processor," Data Sheet, Advanced Micro Devices, Inc., Sep. 1997, 10 pages.

AMD–K6 Processor, "$V_{cc}2$ Voltage Detection," May 1998 Advanced Micro Devices, Inc., 12 pages.

* cited by examiner

Primary Examiner—Paul R. Myers
(74) Attorney, Agent, or Firm—Conley, Rose & Tayon, PC; Lawrence J. Merkel

(57) ABSTRACT

Method and system for preventing electronic overstress during powering up a processor with voltage detection capabilities employing a mechanism for detecting the voltage requirements of the processor to be coupled into a motherboard and accordingly adjusts the power supply of the motherboard to the processor voltage requirements. The detection mechanism includes sensing of logic signals by sensing a voltage from one or more pins of the processor. Those pins are internally connected to ground or internally not connected thus facilitating sensing of logic signals prior to powering up the processor. The probed signals are used to control the power supplied to the processor by adjustment mechanisms applied to power regulator or programmable logic devices. Since the detection of the proper operating voltage requirements of the processor and the consequent adjustment of the voltage power to be supplied to the processor occur during the powering up of the processor, electrical over stress and potential damage of the processor are eliminated.

10 Claims, 9 Drawing Sheets

SYSTEM AND METHOD FOR PROCESSOR DUAL VOLTAGE DETECTION AND OVER STRESS PROTECTION

BACKGROUND OF THE INVENTION

1. Field of the Invention

The present invention relates to processor-based computer systems, and more specifically, to a method and a system for automatically sensing processor operating voltage requirements and accordingly adjusting the power supply populated on a printed circuit board to which the processor is coupled.

2. Description of the Related Art

A processor-based computer system is generally known to comprise, at a minimum, an execution unit, memory and various input/output ports. The execution unit is often referred to as a processor, and the processor is typically linked to the memory via a system bus. The system bus, sometimes referred to as a local bus, links address and data information sent between the processor and memory. The system bus can also link the processor, or memory, to various other subsystems, some of which are arranged on a single printed circuit board. The single printed circuit board is often referred to as a motherboard.

Recent developments in processor technologies provide for an increasing number of different processor types available in the market. Generally, these processors can be used for similar and dissimilar fields of applications. With the increase in the number and complexity of available processors, it becomes increasingly difficult to know the voltage requirements of a specific processor. Voltage requirements include, for example, the level of voltage and the number of levels needed to operate the processor.

As finer geometries are becoming achievable through advances in digital integrated circuit manufacturing processes, lower supply voltages are used to insure optimal operation. The lower supply voltage provides advantages for power consumption and reduces cooling requirements of the processors. Furthermore, the lower power supply voltage may be required to prevent damage to internal circuitry of the processor. However, the I/O pins may be required to operate at a higher voltage for electrical compatibility with industry standard interfaces (e.g., socket 7). Therefore, a processor may have dual operating voltage requirements vs. a single voltage requirement for proper operation. For example, Advanced Micro Device's (AMD's) enhanced 0.35-$\mu$m manufacturing process requires a lower supply voltage for the core, separate from the voltage used to power the I/O pins (for compatibility reasons).

Further, a substantial percentage of motherboards manufactured today can support multiple configurations. Specifically, modem motherboards come equipped with numerous switches or jumpers, which can alter the operation of one or more subsystems arranged thereon. The voltage supplied to a processor can also be changed, for example, by connecting a jumper or actuating a switch. It is therefore necessary when inserting a processor into a motherboard that the operator know which jumper to connect or which switch to activate.

The availability of a wide selection of voltage supplies in motherboards specifically designed to accommodate many types of processors which may differ in voltage supply requirements presents a need for identifying the correct voltage supply requirements. This flexibility further presents a need to correctly adjust the voltage to be supplied to a processor coupled thereto upon appropriate selection of the processor's operating voltage requirements. For example, typical motherboards may have numerous switches and jumpers, wherein the particular switch and jumper of interest must be identified in order to be properly configured, e.g., the system bus frequency or the processor supply voltage.

Generally speaking, a motherboard is manufactured so that it can accommodate dissimilar processors, including processors that respond to differing power supply voltages. Coupled with today's dissimilar processor needs, it is easy to be confused while connecting a processor to a motherboard. Because of this confusion, many processors are often damaged due to electrical over stress when subjected to incorrect voltage settings during power-up.

One solution to the above problems is a system for detecting jumper and switch settings prior to coupling a processor to the motherboard. Such a system employs a probe and a display remotely linked to the probe. The probe contains a sensor, which responds to signals within the motherboard during times when the probe connects to printed conductors embodying those signals. The sensor is designed to detect the system bus frequency and power supply voltage "seen" by a processor to be connected thereto. Accordingly, the probe may couple to a localized area (or socket) of the motherboard on which a processor is designed for coupling. By knowing the voltage arising from the motherboard, a determination can be made if that voltage is compatible with the to-be-used processor. If the voltage is dissimilar from the processor specification, then the motherboard voltage can be changed by identifying the switch of interest and actuating that switch. However, employing such a system requires that the user is familiar with the processor voltage requirements. Further, the user must also be familiar with the motherboard jumpers and switches applicable to voltage supply. Additional disadvantages of such a system include the need to use an additional and external sensing system in order to identify the current settings of the voltage supply on a motherboard in order to be able to adjust the settings to the one appropriate for the processor to be coupled thereto.

A system for detecting the processor supply voltage requirements operable on the processor itself without the need for an external sensing system is therefore desired. Further, a system including a mechanism that is capable of automatically adjusting the power supply into a processor upon identification of the processor needs is also desirable.

SUMMARY OF THE INVENTION

The problems outlined above are in large part solved by a system that employs a mechanism for detecting the voltage requirements of a processor to be coupled into a motherboard and accordingly adjusts the power supply of the motherboard to the processor voltage requirements. The detection mechanism employed by the system includes the sensing of voltage supply indicators built-in to the processor. Processors with built-in voltage power indication capabilities provide voltage supply indications through pins designed to support voltage detection. The voltage supply adjustment mechanism employed by the system includes controlling voltage regulating circuitry to adjust the voltage supplied to the processor as to the appropriate power requirements during the powering up of the processor. Since the detection of the proper operating voltage requirements of the processor and the consequent adjustment of the voltage power to be supplied to the processor occur automatically during the powering up of the processor, electrical over stress and potential damage of the processor may be eliminated.

In one embodiment, the processor to be coupled into a motherboard can provide signals indicative of the number of levels of supply voltage and the value of each level of supply voltage needed to correctly operate the processor. The indicative signals may be detected from the processor by applying dissimilar sensing signals into at least one pin of the processor pins. System logic may be employed to detect the voltage requirements. A plurality of logic signals can be detected in this manner to indicate a plurality of voltage requirements appropriate for the processor.

In one embodiment, the system logic contains circuitry to sense a first pin within a plurality of pins of a processor coupled to an appropriate processor's socket in a motherboard. The first pin of the to-be-coupled processor may be designed to indicate a predetermined level of voltage upon sensing by the system logic circuitry. A logic signal of low and a logic signal of high may be obtained upon sensing the pin by the system logic. The specific level (e.g. low) indicates the processor's dual voltage requirement (versus a single voltage requirement if the signal is, e.g., high). A second sensing of a second pin within the plurality of the processor's pins may indicate the level of voltage that should be supplied to the processor core, which is different from the voltage supplied to the I/O buffers. The first and second sensing of the first and second pins may be achieved simultaneously. The system logic that senses the first and second pins of a processor coupled to an appropriate socket of a motherboard may be coupled to a power supply circuit to control voltages supplied to the processor upon the identification of the processor voltage supply requirements.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

Figure 1:
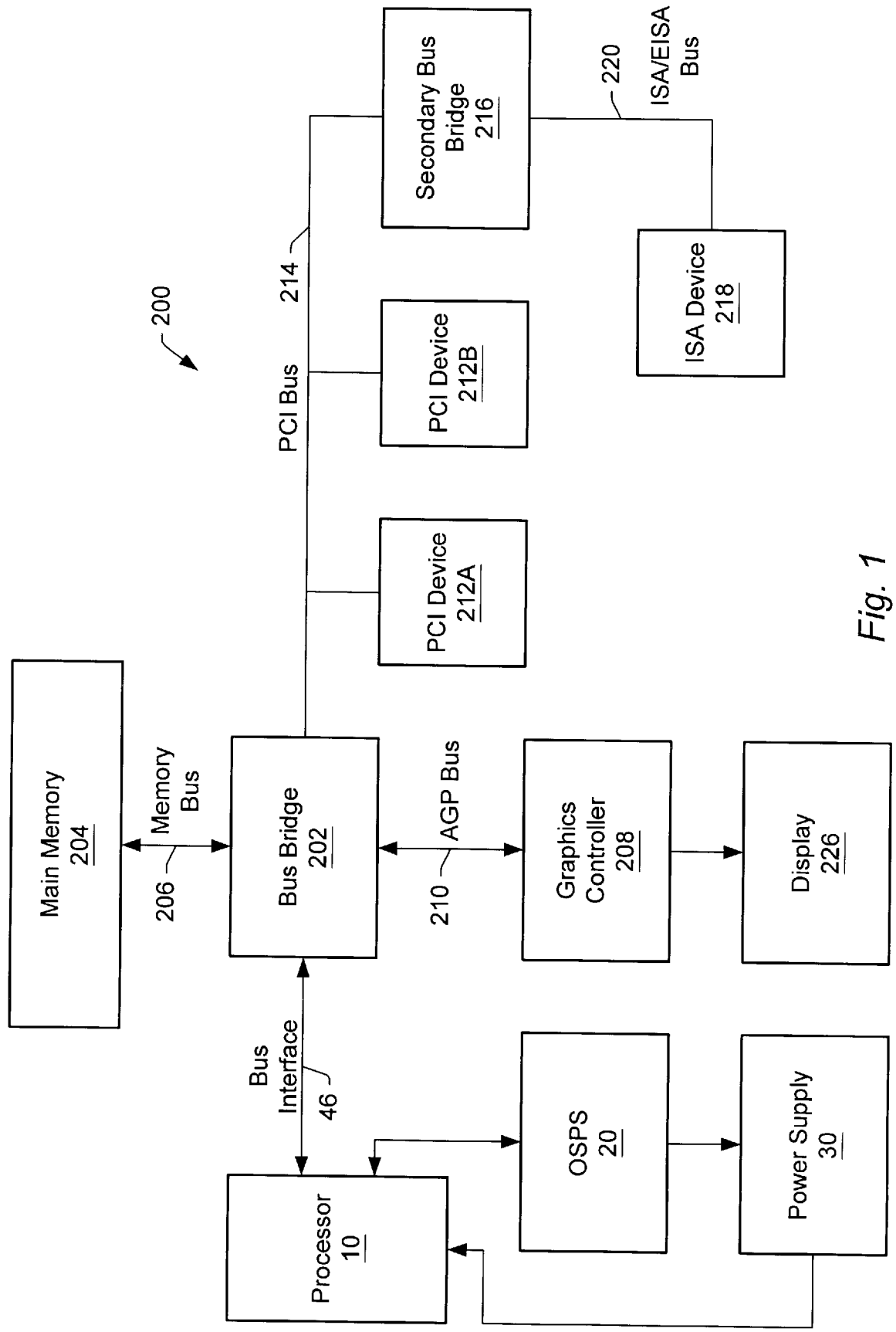
FIG. 1 is a block diagram of one embodiment of a computer system with an electrical over stress protection system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram of one embodiment of a computer system with an electrical over stress protection system is shown. In one embodiment, FIG. 1 shows a computer system 200 including an over stress protection system (OSPS) 20. A processor 10 coupled to a variety of system components in the computer system 200 through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. A plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through bus interface 46. The OSPS 20 is coupled to processor 10 and to a power supply 30. Power supply 30 is configured to supply voltage to different components within computer system 200 including processor 10. Generally, the OSPS may be coupled to one or more pins of processor 10 or the socket connector pins corresponding to those of the processor pins.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200. An external cache unit (not shown) may further be coupled to bus interface 46 between processor 10 and bus bridge 202 in other embodiments. Alternatively, the external cache may be coupled to bus bridge 202 and cache control logic for the external cache may be integrated into bus bridge 202. In yet another alternative, processor 10 may include a "backside cache" configuration in which a separate connection from bus interface 46 is used to connect to an L2 cache. Such a configuration may include the L2 cache and processor 10 incorporated onto a module (e.g. slot 1 or slot A).

Main memory 204 is a memory in which application programs are stored and from which processor 10 primarily executes. A suitable main memory 204 comprises DRAM (Dynamic Random Access Memory). For example, one or more banks of SDRAM (Synchronous DRAM) or RDRAM (RAMBUS DRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc. It is noted that, while the AGP, PCI, and ISA or EISA buses have been used as examples in the above description, any bus architectures may be substituted as desired. It is further noted that computer system 200 may be a multiprocessing computer system including additional processors.

Figure 2:
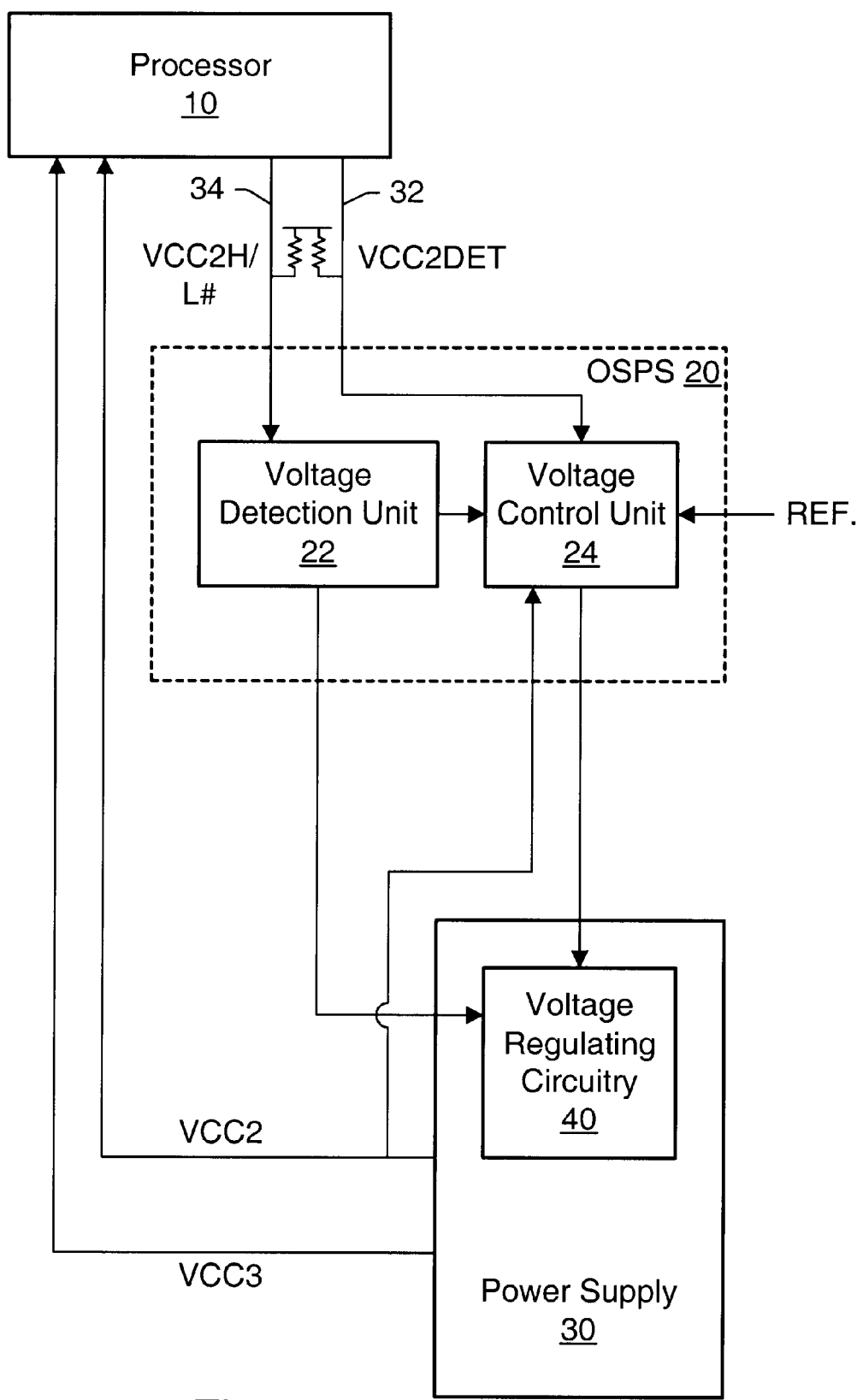
FIG. 2 is a block diagram depicting one embodiment of an over stress protection system (OSPS)

Turning now to FIG. 2, an embodiment of the OSPS 20 is shown. The OSPS 20 includes a voltage detection unit 22 and a voltage control unit 24. The voltage detection unit 22 is coupled to a processor 10 and the voltage control unit 24. The voltage control unit 24 is coupled to a voltage regulating circuitry 40 of power supply 30. In one embodiment, the voltage control unit 24 is configured to sense a pin of processor 10 wherein processor 10 is equipped with voltage detection capabilities through at least one pin. Such a pin may be the VCC2DET pin 32 shown in FIG. 2. The VCC2DET pin 32 may be used to convey a logic signal indicative of a dual voltage requirement or single voltage requirement of the processor. The voltage detection unit 22 may be additionally configured to sense a second pin of processor 10. The second pin can be used to indicate to the OSPS 20 a level of one of operating voltages of the dual voltages which must be supplied to processor 10 for proper operation upon detection of a dual voltage requirement using the first pin. The second pin may be, for example, the VCC2H/L# pin 34 shown in FIG. 2.

The operation of the OSPS 20 is performed during the powering up phase of the processor to be connected into a printed circuit board prior to the actual supply of the power to the processor. The power may be supplied by a power supply unit built into the printed circuit board or by an external power supply unit. This step is implemented to insure detection of the voltage requirement prior to actually powering the core and the I/O buffers of the processor to be coupled thereto. Therefore, the OSPS 20 performs its functions prior to actual powering up of the processor. The voltage control unit 24 of the OSPS 20 (FIG. 2) is configured to control (i.e. enable/disable) the voltage supply to the processor core and I/O buffers. Voltage detection unit 22 is configured to control the level of voltages supplied to the processor. By such configuration, power supplied to the processor is supplied after the OSPS 20 determines the voltage requirements of the processor coupled thereto. The power supply 30 is therefore prevented from supplying power unless a control from the voltage control unit 24 is asserted to the voltage regulating circuitry 40 indicating that powering the processor is now safe.

In the present disclosure, OSPS 20 is described as sensing various pins. For example, processor 10 may be internally configured with either a connection of the sensed pins to ground or no connection. Accordingly, an external pullup resistor may be provided upon each sensed pin and detect either a logic low (pin connected to ground) or a logic high (floating pin pulled up by the pullup resistor). Other configurations are possible as well. For example, two pins could be optionally connected together or not connected together, and the connection/lack of connection could be sensed externally. A current could be supplied to one of the pins and current sensed at the other pin to detect the connection or lack of connection. As yet another example, the sensed pins could be connected/not connected to a particular pin powered by OSPS 20 during power up. In such an embodiment, pins would be either a logic high (pin connected) or floating (pin not connected) and pulldown resistors may be used. A variety of alternatives are contemplated.

Figure 3:
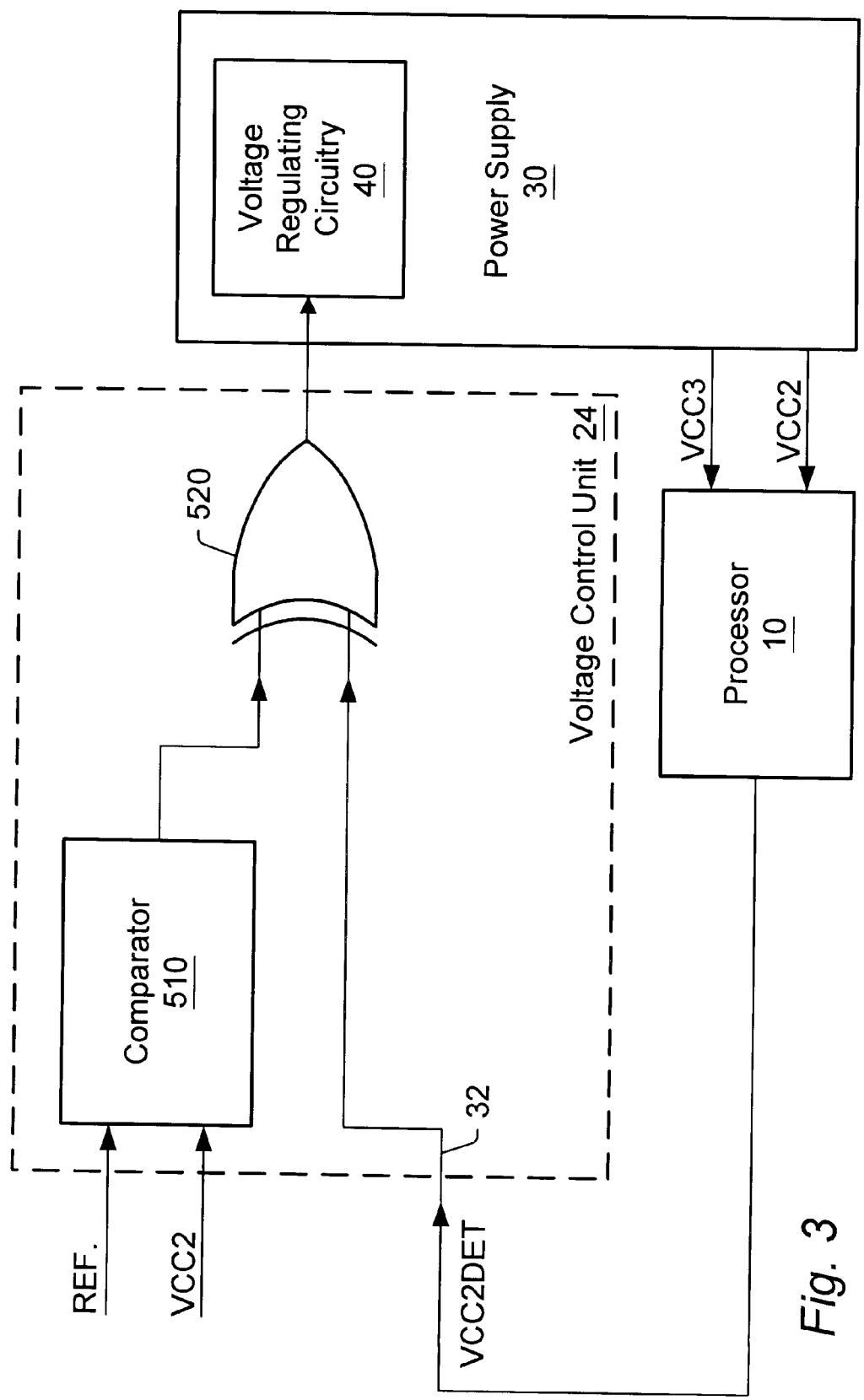
FIG. 3 is a block diagram of an embodiment of the OSPS using a sensed logic signal from a processor.

Turning now to FIG. 3, an embodiment of the voltage control unit 24 is depicted. As shown, a comparator circuit 510 is used to detect two voltage signals from a power supply unit. A reference voltage (such as 3.3 volts) and the core supply voltage (VCC2) from the power supply are sampled by the voltage control unit 24 prior to the powering up of the processor. The comparator 510 compares the reference voltage signal with the core voltage signal (VCC2) of the power supply and generates a logic output indicative of the result of the comparison. In the present embodiment, the output signal of comparator 510 is a logical one if VCC2 is less than the reference voltage and a logical zero if the VCC2 is greater than the reference voltage. The logic output of the comparator 510 is exclusively ORed (circuit 520) with the logic level sensed on the VCC2DET pin 32 from processor 10. The output of the logic circuit 520 is supplied to the power supply regulator circuitry 40 within power supply 30. If the output is high, voltage regulating circuitry 40 is enabled and processor 10 may be powered up. On the other hand, if the output is low, voltage regulating circuitry 40 is disabled and processor 10 is not powered up.

Accordingly, processor 10 is powered up if: (i) the selected VCC2 (core) voltage is less than the reference voltage and VCC2DET pin 32 is a logical low, indicating dual power supply requirements for processor 10; or (ii) the selected VCC2 voltage is greater than the reference voltage and VCC2DET pin 32 is a logical high, indicating single power supply requirements for processor 10. Situation (i) may be indicative of, for example, an AMD-K5™ processor while situation (ii) may be indicative of an AMD-K6® processor in one illustrative example. It is noted that the selected VCC2 voltage may be selected in accordance with the VCC2DET and VCC2H/L# pins as described in more detail below.

Figure 4:
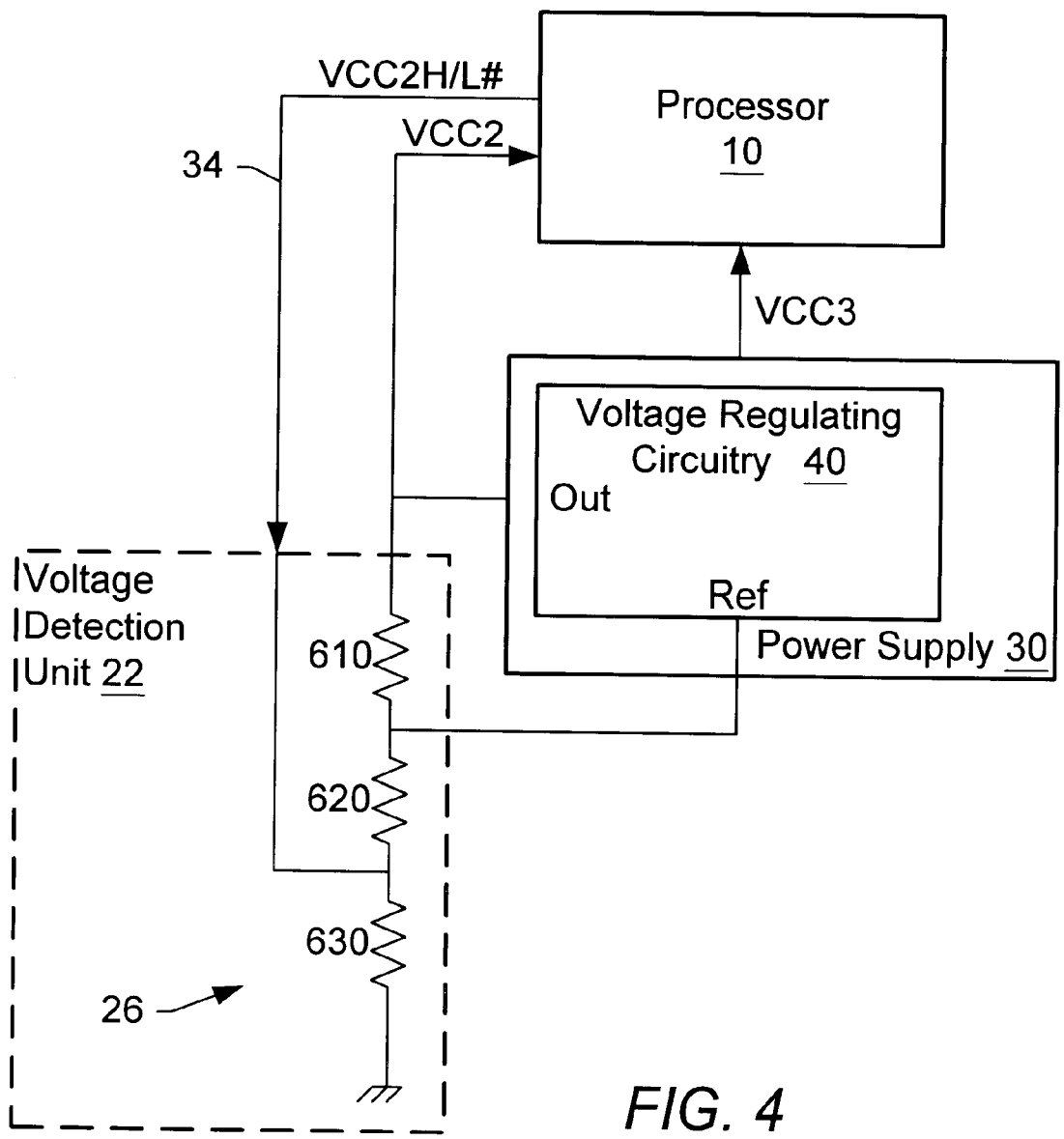
FIG. 4 is a block diagram of an embodiment of the OSPS using a second sensed logic signal from a processor.

Turning now to FIG. 4, a block diagram of an embodiment of the voltage detection unit 22 is shown wherein a second logic signal sensed from a processor is used as to control the supply voltage level to the processor. In this embodiment, the VCC2H/L# pin 34 is used by voltage detection unit 22 to control voltage regulator 40. The condition of the sensed VCC2H/L# signal is either directly or indirectly used to control the level of a power signal to be supplied to the processor. The logic signal on the VCC2H/L# pin is applied into a voltage-divider resistor circuit 26. If the VCC2H/L# signal is low (e.g., the pin is internally connected to ground), resistor 630 is bypassed (shorted to ground) and the resulting voltage applied to the processor is reduced to the desired voltage. If the VCC2H/L# signal is not low (for example, the pin is not internally connected to ground), the voltage supplied is developed across the complete resistor circuit (610, 620, and 630) and a higher voltage supply is applied to the processor. The adjustment applied to the voltage supply signal to the processor allows the voltage regulator circuit 40 to apply the correct voltage to the core voltage pins (VCC2 pins) of the processor. Thus, the processor may be powering up with a different core voltage (e.g., dual-voltage) than the voltage applied to the I/O buffer pins of the processor (whose power may be applied separately from a VCC3 output of the power supply 30 as shown in FIG. 4). Voltage detection unit 22 may not need to provide a pullup resistor on VCC2H/L# pin 34 in this example.

Figure 5:
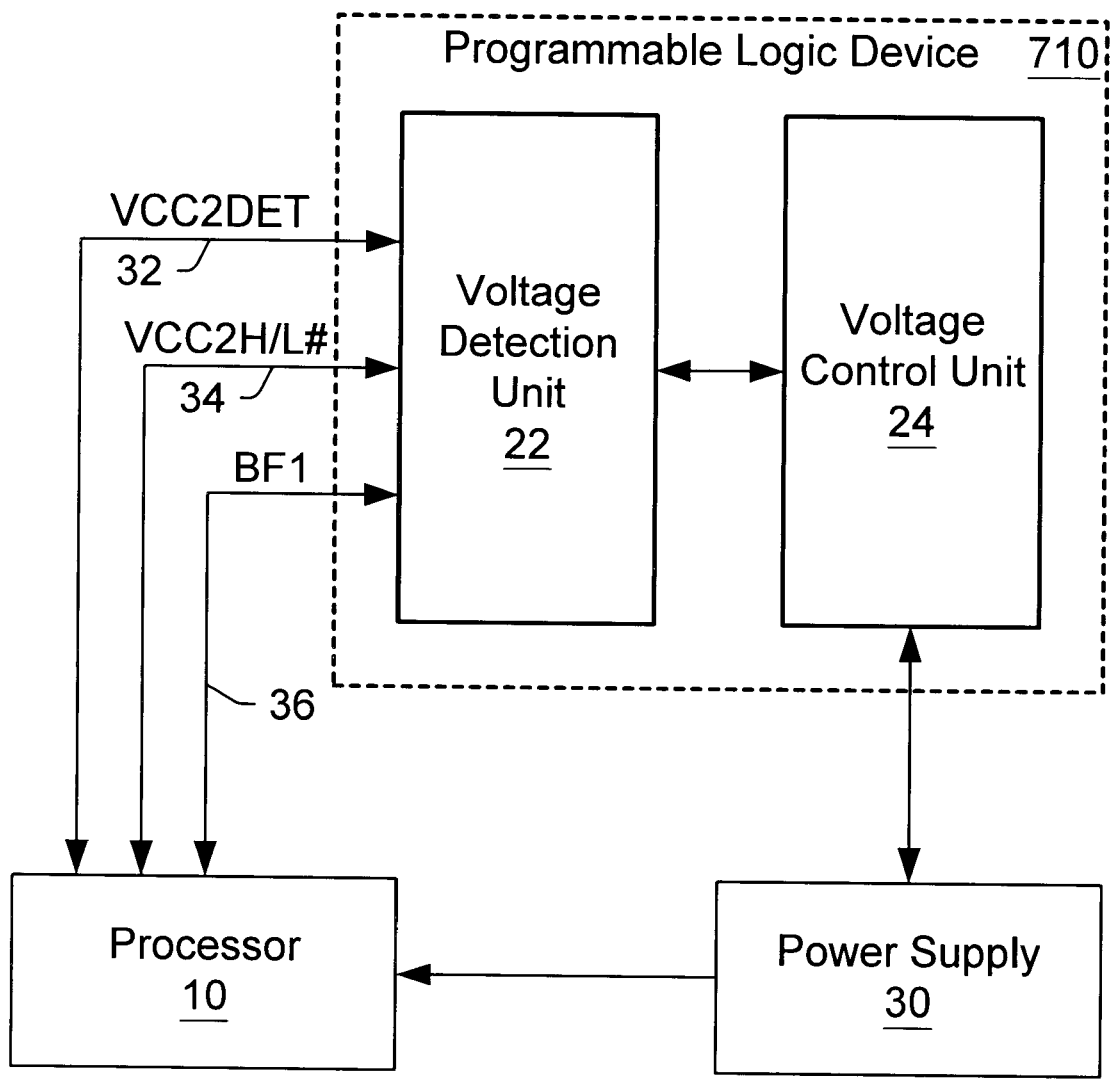
FIG. 5 is a block diagram of an embodiment of the OSPS using three sensed logic signals from a processor.

Turning now to FIG. 5, an embodiment of the OSPS 20 is shown where more than two logic signals are detected from a processor to be coupled into a printed circuit board with a range of supply voltages by a power supply. In this embodiment, the voltage detection unit 22 is used to sense logic signals from more than two pins of the processor s to be coupled to the printed circuit board. In addition to the usage of the logic signals detected from a first pin and a second pin, the logic signals detected from a third or more pins are used to adjust the voltage supplied to the processor through a programmable logic device (PLD) 710. Since more logic signals are detected by the voltage detection unit 22, more options are available due to larger combinations of logic and thus more voltage levels may be adjusted or selected for supply into the processor, thus covering a range of operating voltage requirements for many processors and printed circuit boards. In the embodiment of FIG. 5 at least three logic signals may be detected. For example, the logic signals may be detected from the VCC2DET, VCC2H/L#, and BF1 pins of the processor 10 (reference numerals 32, 34, and 36, respectively). The detected logic signals are supplied to the programmable detection unit 710 prior to the powering up of processor 10. The output of the PLD is used to adjust or select the number and level of voltage supply signals to be supplied into the processor.

Figure 6:
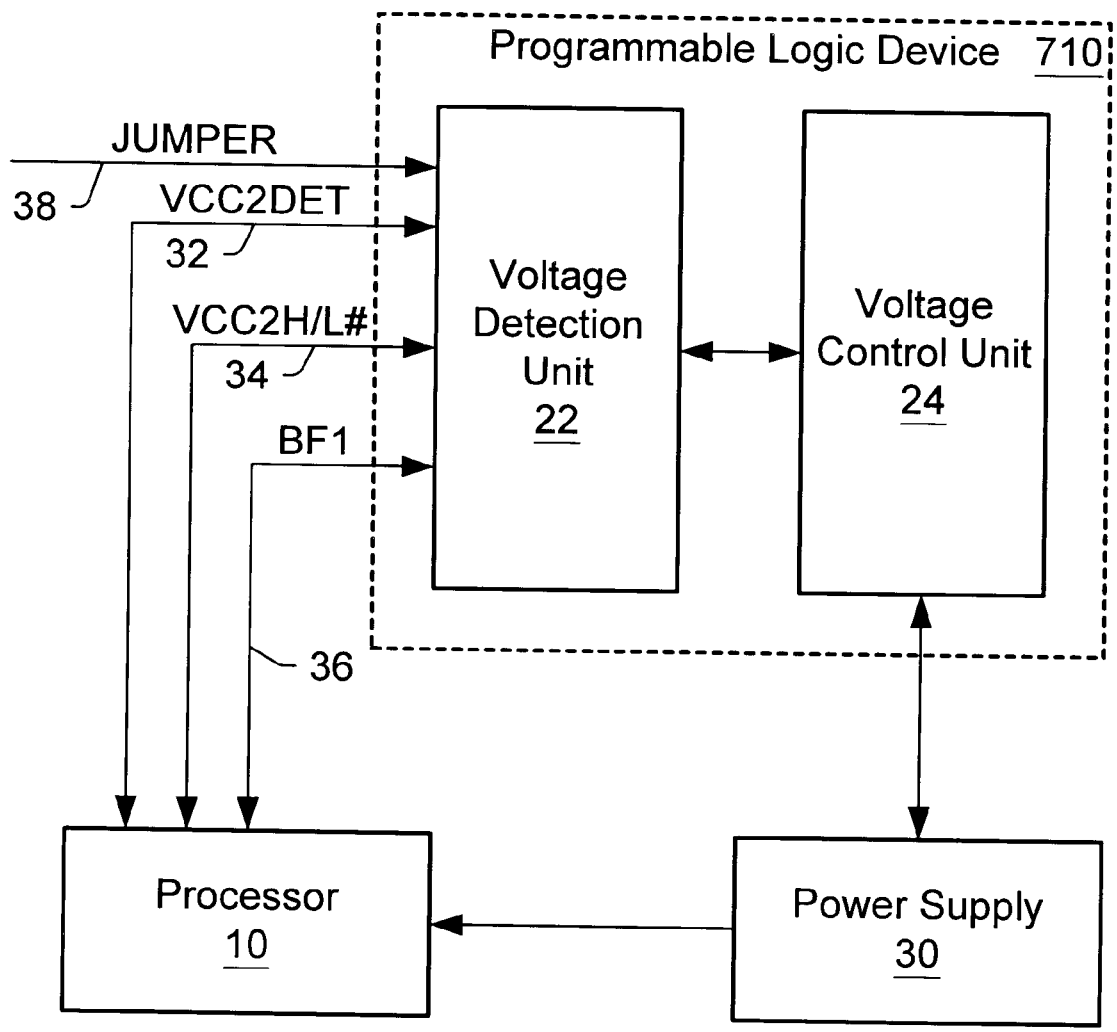
FIG. 6 is a block diagram of an embodiment of the OSPS using a combination of sensed logic signals from a processor and a signal from a board to which the processor is coupled.

Turning now to FIG. 6, at least one signal (e.g. a jumper 38) is detected from a printed circuit board to which a processor 10 is to be coupled. These signals from the printed circuit board are sampled by the voltage detection unit 22 as additional signals to the logic signals sensed from the processor pins (VCC2DET, VCC2H/L#, and BF1 are shown as reference numerals 32, 34, and 36, respectively). In the embodiment shown in FIG. 6, signals from jumpers in the printed circuit board can be added to the input of the voltage detection unit 22 as illustrated. The additional signals provide additional options that can be supplied into a voltage control unit or the PLD 710, thus resulting in a wider range of selection as more voltage control options become available due to more selection options generated from the combination of a larger number of signals.

Figure 7:
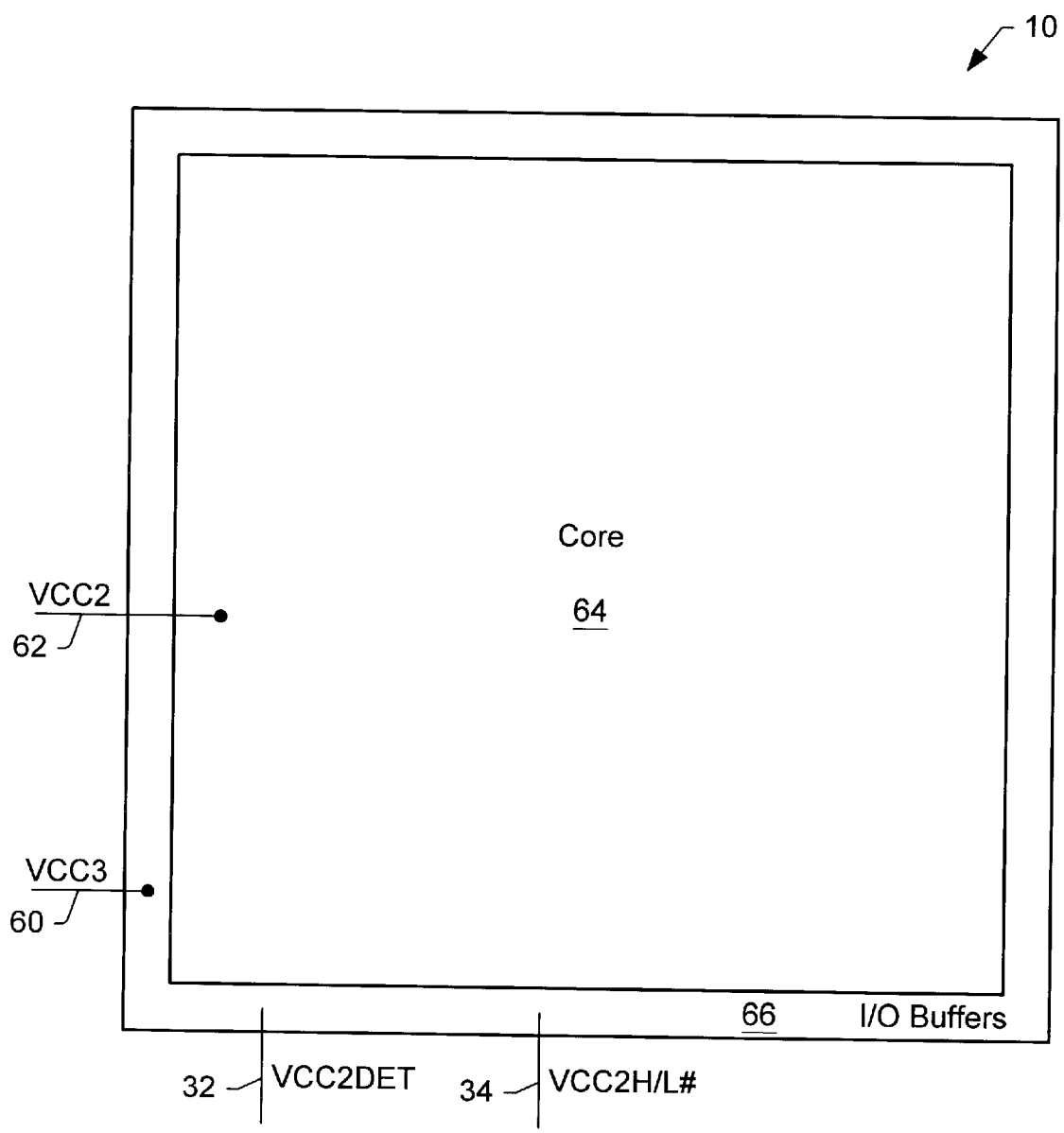
FIG. 7 is a block diagram of one embodiment of a processor shown in FIG. 1.

Turning next to FIG. 7, a block diagram of one embodiment of processor 10 is shown in more detail. In the embodiment of FIG. 7, processor 10 includes a core 64 and one or more I/O buffers 66. Additionally, processor 10 includes VCC2DET pin 32 and VCC2H/L# pin 34 (as well as other pins used by I/O buffers 66 for communication, not shown). The core voltage (VCC2) is illustrated by a pin 62. However, it is noted that multiple pins may be used to supply the core voltage. Similarly, the I/O voltage (VCC3) is shown as a pin 60. However, it is noted that multiple pins may be used to supply the I/O voltage. Generally, core 64 includes the logic circuitry employed to perform the functions of processor 10, while I/O buffers 66 include the circuitry for communicating with other devices (e.g. using bus interface 46). The core voltage provided on VCC2 pin(s) 62 powers the circuitry in core 64, while the I/O voltage provided on VCC3 pin(s) 60 powers the I/O buffer circuitry in I/O buffers 66.

Figure 8:
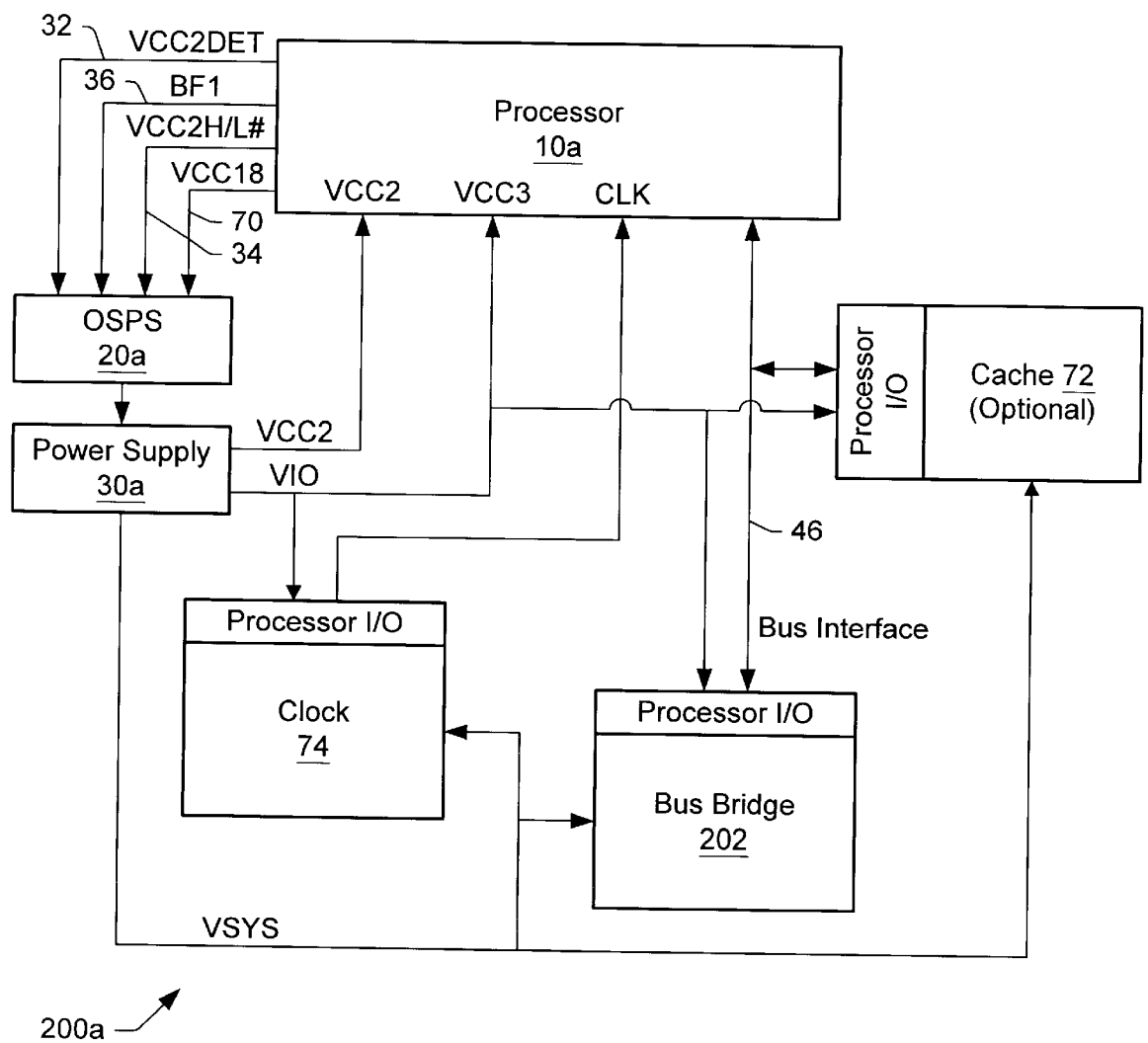
FIG. 8 is a block diagram of a portion of another embodiment of a computer system.

Turning now to FIG. 8, a block diagram of a portion of another embodiment of a computer system (computer system 200a) is shown. Other embodiments are possible and contemplated. In the embodiment of FIG. 8, a processor 10a is coupled to an OSPS 20a, a power supply 30a, a clock unit 74, bus bridge 202, and an optional cache 72. More particularly, processor 10a is coupled to OSPS 20a via VCC2DET pin 32, VCC2H/L# pin 34, BF1 pin 36, and a VCC18 pin 70. Furthermore, processor 10a receives a core voltage supply VCC2 and an I/O voltage supply VCC3 from power supply 30a. Processor 10a is configured to receive a clock signal from clock unit 74 and is coupled to communicate via bus interface 46 with bus bridge 202 and cache 72.

Processor 10a is configured to indicate its dual voltage requirements using VCC2DET pin 32, as described above for processor 10. Furthermore, processor 10a is configured to indicate a high or low voltage level requirement for VCC2 via the VCC2H/L# pin 34 similar to the above description. However, processor 10a may require an even lower VCC2 voltage than processor 10 (e.g. 1.8 volts). Furthermore, processor 10a requires that VCC3 be lower than that required by processor 10 (e.g. 2.5 volts). Processor 10a indicates these lower voltage requirements using VCC18 pin 70.

Figure 9:
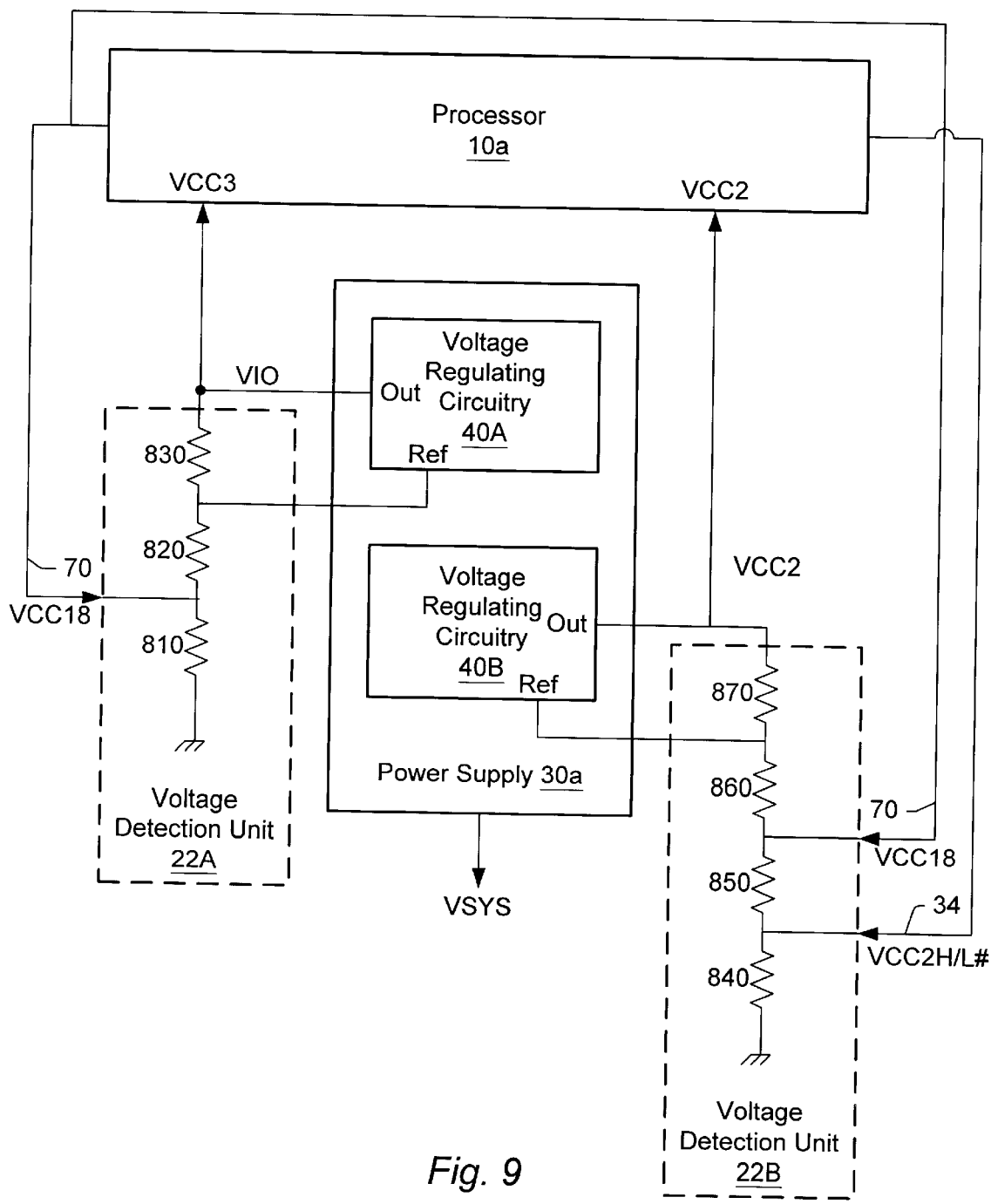
FIG. 9 is a block diagram of a portion of the OSPS shown in FIG. 8.

In one embodiment, VCC18 pin 70 is either internally not connected or internally connected to ground. An external pullup resistor may be used to pull up VCC18 pin 70 similar to VCC2DET and VCC2H/L# pins 32 and 34. Alternatively, as illustrated in FIG. 9 below, pullup resistors may be eliminated with an appropriate voltage detection unit. Alternative connections for VCC18 pin 70 are possible as well, similar to the above description of the VCC2DET and VCC2H/L# pins.

In response to the VCC2H/L# and VCC18 pins, OSPS 20a controls power supply 30a to provide power to processor 10a and to other devices shown in FIG. 8. The VCC2 voltage is generated in response to both the VCC2H/L# and VCC18 pins. For example, in one exemplary embodiment, if VCC2H/L# pin 32 is floating and VCC18 pin 70 is floating, then VCC2 may be supplied at 2.9 volts. If VCC2H/L# pin 32 is a logic low and VCC18 pin 70 is floating, then VCC2 may be supplied at 2.2 volts. Finally, if VCC18 is a logic low, then VCC2H/L# pin 32 is a don't care and VCC2 may be supplied at 1.8 volts. Other voltage levels may be selected in other embodiments, according to the requirements of the particular processor, and the VCC2H/L# pin and VCC18 pin may be used to select between a high, medium, and low voltage level from among the desired voltage levels. The generated VCC2 voltage is provided to the VCC2 pin(s) of processor 10a.

Power supply 30a further generates a VIO voltage responsive to VCC18 pin 70. The VIO voltage is supplied to the VCC3 pin(s) of processor 10a, and is the voltage supplied to the I/O buffers of other devices which communicate with processor 10a (or at least those I/O buffers coupled to pins of processor 10a). In this manner, all devices coupled to processor 10a may employ voltage levels compatible with processor 10a. As shown in FIG. 8, for example, the processor I/O sections of clock unit 74, bus bridge 202, and cache 72 are powered by the VIO voltage. On the other hand, remaining portions of theses devices may be powered with a VSYS voltage (e.g. 3.3 volts) provided by power supply 30a.

Turning next to FIG. 9, a block diagram illustrating processor 10a, power supply 30a, and portions of OSPS 20a is shown. Other embodiments are possible and contemplated. In FIG. 9, voltage detection units 22A and 22B are shown. Voltage detection units 22A and 22B, in addition to a voltage control unit 24 described above, may comprise one embodiment of OSPS 20a.

Voltage detection unit 22A may operate in conjunction with voltage regulating circuitry 40A to produce the VIO voltage from power supply 30a. In the embodiment shown, voltage detection unit 22A comprises a voltage divider circuit including resistors 810, 820, and 830 connected in series. VCC18 pin 70 is coupled to the node between resistors 810 and 820. Accordingly, if VCC18 is connected to ground, then resistor 810 is bypassed (i.e. shorted). The VIO voltage is therefore lowered to the desired lower voltage level (e.g. 2.5 volts). On the other hand, if VCC18 is floating, the VIO voltage is developed across the entire set of resistors 810–830, and a higher VIO voltage is generated (e.g. 3.3. volts).

Voltage detection unit 22B controls voltage regulating circuitry 40B to generate the VCC2 voltage as one of three possible voltage levels in response to the VCC18 pin 70 and the VCC2H/L# pin 34. Voltage detection unit 22B comprises a voltage divider circuit including resistors 840, 850, 860, and 870 connected in series. VCC18 pin 70 is coupled to the node between resistors 860 and 850, and VCC2H/L# pin 34 is coupled to the node between resistors 840 and 850. Accordingly, if both VCC2H/L# pin 34 and VCC18 pin 70 are floating, the VCC2 voltage is developed across the entire set of resistors 840–870 and the highest voltage deliverable by voltage regulating circuitry 40B and voltage detection unit 22B is provided (e.g. 2.9 volts). On the other hand, if VCC2H/L# pin 34 is connected to ground and VCC18 pin 70 is floating, resistor 840 is shorted and the VCC2 voltage is lowered (e.g. to 2.2 volts). Finally, if VCC18 pin 70 is connected to ground, both resistors 840 and 850 are shorted and the VCC2 voltage is lowered even further (e.g. to 1.8 volts).

It is noted that voltage regulating circuitry 40A–40B may comprise any suitable voltage regulator (e.g. linear regulators or DC/DC converters). Preferably, voltage regulating circuitry 40A may comprise a linear regulator and voltage regulator circuitry 40B may comprise a linear regulator or DC/DC converter. It is further noted that any suitable values may be selected for resistors 610–630 (shown in FIG. 4) and 810–870 (shown in FIG. 9). Generally, the resistance of each of resistors 610–630 is selected to supply the desired higher VCC2 voltage when resistor 630 is not shorted and the desired lower VCC2 voltage when resistor 630 is shorted. Similarly, the resistance of each of resistors 810–830 is selected to supply the desired higher VIO voltage when resistor 810 is not shorted and the desired lower VIO voltage when resistor 810 is shorted. Finally, the resistance of each of resistors 840–870 is selected to supply the desired highest VCC2 voltage when resistors 840 and 850 are not shorted, the desired medium VCC2 voltage when resistor 840 is shorted by 850 is not shorted, and the desired lower VCC2 voltage when resistors 840 and 850 are both shorted. The ability to indicate and adjust voltage levels in the manner shown may be extended to any desired number of voltage selections by employing additional pins in an encoded or non-encoded format.

It is noted that embodiments employing programmable logic devices and OSPS 20a are contemplated as well (similar to the embodiments of FIGS. 5 and 6). It is further noted that pins of processors 10 and 10a are described herein as being coupled to other circuits (e.g. OSPS 20, power supply 30, etc.). The pins may be coupled, for example, either directly or indirectly through wiring on the printed circuit board or other electrical coupling to the receiving devices.

It is noted that, while certain pin names have been used corresponding to an illustrative embodiment corresponding to an AMD-K6® processor, the pin names are not meant to be restrictive. Any pins may be selected in any type of processor for providing automatic voltage detection in accordance with the present disclosure. Furthermore, multiple pins may be used to indicate more than two possible voltage levels for VCC2, or even VCC3, as desired.

Different combinations of signals sensed from the processors and signals obtained from the printed circuit board may be used for the purpose of this embodiment and as in the embodiments of this invention. Accordingly, various modifications and changes may be made without departing from the spirit and scope of the invention as set forth in the claims. It should be noted that numerous variations and modifications will become apparent to those skilled in the art once the above disclosure is fully appreciated. It is intended that the following claims be interpreted to embrace all such modifications and changes. The specification and drawings are to be regarded in an illustrative rather than a restrictive sense.

What is claimed is:

1. A processor comprising:
   a first core powered by a first supply voltage;
   a first input/output buffer coupled to said first core, said first input/output buffer powered by a second supply voltage different from said first power supply voltage;
   a first pin adapted to indicate a first signal indicative of a value of each of said first supply voltage and said second supply voltage, wherein said first signal, in a first state, is indicative of a first voltage for said first supply voltage and a second voltage for said second supply voltage;
   a second pin adapted to indicate a second signal indicative of a third voltage for said first supply voltage independent of said first signal; and
   a third pin adapted to indicate a third signal indicative of a number of supply voltages required by said processor.

2. The processor as recited in claim 1 wherein each of said first pin, said second pin, and said third pin are internally either connected to a ground or not connected.

3. An apparatus comprising:
   a voltage detection unit coupled to at least a first pin of a processor, wherein a first signal on said first pin is indicative of a value of each of a first supply voltage for a core section of said processor and a second supply voltage for an input/output buffer of said processor, said first supply voltage different from said second supply voltage, and wherein said first signal, in a first state, is indicative of a first voltage for said first supply voltage and a second voltage for said second supply voltage; and
   a voltage control unit coupled to said voltage detection unit, wherein said voltage control unit is configured to selectively enable said first supply voltage and said second supply voltage, and wherein said voltage control unit is coupled to at least a second pin of said processor, wherein a second signal on said second pin is indicative of a number of supply voltages required by said processor, wherein said voltage control unit is configured to selectively enable said first supply voltage and said second supply voltage responsive to said second signal.

4. The apparatus as recited in claim 3 wherein said voltage detection unit is further coupled to a third pin of said processor, wherein a third signal on said third pin is indicative of a third voltage for said first supply voltage independent of said first signal.

5. The apparatus as recited in claim 4 wherein said voltage detection unit comprises a first resistor coupled between a first node and a ground and a second resistor coupled to said first node, and wherein said third pin is coupled to said first node.

6. The apparatus as recited in claim 5 wherein said second resistor is coupled to a second node to which a third resistor is also coupled, and wherein said first pin is coupled to said second node.

7. The apparatus as recited in claim 6 wherein said third resistor is coupled to a third node, and wherein a reference input of a voltage regulator circuit is coupled to said third node, and wherein said voltage detection unit further comprises a fourth resistor coupled to said third node and a fourth node, and wherein an output of said voltage regulator circuit is coupled to said fourth node, and wherein said fourth node is coupled to provide said first supply voltage to said processor.

8. The apparatus as recited in claim 7 wherein said voltage detection unit further comprises a fifth resistor coupled between a fifth node and said ground and a sixth resistor coupled to said fifth node, and wherein said first pin is coupled to said fifth node.

9. The apparatus as recited in claim 8 wherein said sixth resistor is coupled to a sixth node, and wherein a reference input of a second voltage regulator circuit is coupled to said sixth node, and wherein said voltage detection unit further comprises a seventh resistor coupled to said sixth node and a seventh node, and wherein an output of said second voltage regulator circuit is coupled to said seventh node, and wherein said seventh node is coupled to provide said second supply voltage to said processor.

10. A method comprising:
  receiving a first signal from a first pin of a processor, said first signal indicative of a value of each of a first supply voltage for a core section of said processor and a second supply voltage for an input/output buffer of said processor, said first supply voltage different from said second supply voltage, wherein said first signal, in a first state, is indicative of a first voltage for said first supply voltage and a second voltage for said second supply voltage;
  receiving a second signal on a second pin of said processor, said second signal indicative of said first supply voltage independent of said first signal;
  adjusting said first supply voltage and said second supply voltage responsive to said first signal and said second signal; and
  receiving a third signal on a third pin of said processor, said third signal indicative of a number of supply voltages required by said processor.

* * * * *